United States Patent
Benedictus et al.

(10) Patent No.: US 6,592,763 B1
(45) Date of Patent: Jul. 15, 2003

(54) METHOD AND DEVICE FOR TREATING AQUEOUS FLOWS IN A BIOREACTOR, AN ULTRAFILTRATION UNIT AND A MEMBRANE FILTRATION UNIT

(75) Inventors: Hendrik Rienk Benedictus, Heerenveen (NL); Walterus Gijsbertus Joseph Van Der Meer, Sneek (NL); Jacobus Cornelis Van Winkelen, Leeuwarden (NL)

(73) Assignees: N.V. Waterleiding Friesland, Leeuwarden (NL); B.V. Beheermaatschappij Frisia, Haulerwijk (NL)

( * ) Notice: Subject to any disclaimer, the term of this patent is extended or adjusted under 35 U.S.C. 154(b) by 0 days.

(21) Appl. No.: 09/622,988
(22) PCT Filed: Feb. 24, 1999
(86) PCT No.: PCT/NL99/00101
§ 371 (c)(1),
(2), (4) Date: Nov. 13, 2000
(87) PCT Pub. No.: WO99/43622
PCT Pub. Date: Sep. 2, 1999

(30) Foreign Application Priority Data

Feb. 26, 1998 (NL) .............................................. 1008425

(51) Int. Cl.⁷ .......................... B01D 61/00; B01D 63/00
(52) U.S. Cl. ....................... 210/652; 210/641; 210/650; 210/651; 210/600; 210/607; 210/610; 210/612; 210/175; 210/195.2; 210/257.2; 210/903
(58) Field of Search ................................ 210/650, 651, 210/652, 641, 195.2, 257.2, 903, 750, 631, 600, 610, 612, 607, 175

(56) References Cited

U.S. PATENT DOCUMENTS

| | | | |
|---|---|---|---|
| 4,812,237 A | * | 3/1989 | Cawley et al. |
| 5,039,416 A | * | 8/1991 | Loew et al. |
| 5,230,803 A | | 7/1993 | Thüer et al. |
| 5,540,836 A | * | 7/1996 | Coyne |
| 5,746,920 A | * | 5/1998 | Boergardts et al. |
| 5,910,249 A | * | 6/1999 | Koop et al. |
| 6,113,787 A | * | 9/2000 | Czermak et al. |

FOREIGN PATENT DOCUMENTS

| | | |
|---|---|---|
| DE | 19614214 A1 | 10/1997 |
| JP | 63-69598 | 3/1988 |
| JP | 9-271771 | 10/1997 |

OTHER PUBLICATIONS

Minoru, F. "Treatment of Organic Sewage Containing Phosphorus," *Patent Abstracts of Japan 63–069598*, Mar. 29, 1988.

Motoyuki, A. "Method of Purifying Volatile Organic Compound Containing Water Using Reverse Osmosis Membrane," *Patent Abstracts of Japan 9–271771*, Oct. 21, 1997.

* cited by examiner

*Primary Examiner*—Ana Fortuna
(74) *Attorney, Agent, or Firm*—Seed IP Law Group PLLC

(57) ABSTRACT

A novel method for purifying, by means of an essentially closed circuit water purification system, an aqueous flow from a processing unit includes the steps of: (a) supplying to a bioreactor, and combining therein, the aqueous flow, as well as a discharge flow from a membrane filtration unit; (b) allowing microbiological conversion of biodegradable constituents to take place therein, thereby, generating an effluent flow; (c) supplying the bioreactor effluent flow to an ultrafiltration unit, thereby, separating the effluent flow into permeate and concentrate flows; (d) supplying at least some of the permeate flow to a membrane filtration unit, thereby, generating a product flow and the discharge flow; and (e) supplying the discharge flow to the bioreactor, as noted in step (a), and supplying at least a portion of the product flow to the processing unit. Apparatus related thereto are also disclosed.

19 Claims, 3 Drawing Sheets

METHOD AND DEVICE FOR TREATING AQUEOUS FLOWS IN A BIOREACTOR, AN ULTRAFILTRATION UNIT AND A MEMBRANE FILTRATION UNIT

The present invention relates to a method for treating aqueous flows in a bioreactor and alit ultrafiltration unit, wherein the effluent from the bioreactor is supplied to the ultrafiltration unit, in which it is separated into a permeate flow and a concentrate flow.

The present invention furthermore relates to a device for treating aqueous flows in a bioreactor, an ultrafiltration unit and a membrane filtration unit, which device is provided with the necessary pipes and pumps, whereby a separation into a permeate flow and a concentrate flow takes place in said ultrafiltration unit, which permeate flow is connected to a membrane filtration unit via a pipe. The present invention furthermore relates to the use of such a device.

Such a device is known from German Offenlegungsschrift No. 196 14 214. With the device which is known from said publication, waste water is first subjected to an ozone treatment or a similar catalytic decomposition process, for example by means of $H_2O_2$ and UV radiation, and subsequently it is supplied to a bioreactor. In the bioreactor, a biological conversion takes place, wherein the effluent is led to an ultrafiltration unit, in which it is separated into a permeate flow and a concentrate flow. The permeate flow thus obtained is supplied to a buffer vessel. The effluent from the buffer vessel is then supplied to a nanofiltration unit, in which nanofiltration unit a separation into purified water and retentate takes place, which retentate is subsequently supplied to the bioreactor again together with the concentrate from the ultrafiltration unit. From the said German Offenlegungsschrift it can only be derived that the water which has been purified at the nanofiltration unit can be used as process water for industrial or agricultural purposes, for example.

Such a method is furthermore known from Japanese patent application JP 09 271771, which discloses a method for purifying water which is contaminated with volatile organic compounds, using a reverse osmosis type membrane. According to the method which is known therefrom, the contaminated water is led to a storage tank, after which it is pumped to an ultrafiltration membrane unit under pressure, whereby the concentrate flow produced in the ultrafiltration membrane unit is recirculated to the storage tank. The permeate flow which is also produced at the ultrafiltration membrane unit is then led to a reverse osmosis type membrane, S wherein the waste flow which is produced at said membrane is also recirculated to the storage tank. The product flow from the reverse osmosis type membrane unit is discharged. The use of the product flow produced at the membrane filtration unit is not known from said Japanese patent application. Moreover, no biological conversion takes place, as there is no bioreactor.

Such a method is also known from Japanese patent application JP 63 069598, which discloses a method for raising the phosphorous content in a dewatered sludge cake. Thus, waste water is subjected to a biological treatment step, wherein the sludge which is produced in said treatment step is supplied to an ultrafiltration membrane unit, in which it is separated into a slurry and a permeate water flow. Said permeate water flow is furthermore separated into a concentrated liquid flow and a product flow in a reverse osmosis type membrane, wherein the product flow is brought into contact with an adsorption agent for the purpose of removing phosphorous. The concentrated liquid flow is then mixed with the excess biological sludge from the biological treatment step, and with the sludge from the ultrafiltration membrane unit, whereby the mixture thus obtained is subsequently dewatered and the obtained water flow is recirculated to the biological treatment step. It is not known from said Japanese patent application to reuse the product flow, from which the phosphorous has been removed, in an advantageous manner. Moreover, the concentrated liquid obtained at the reverse osmosis type membrane must first be mixed with other liquid flows and then be dewatered, after which the recirculation to the biological treatment step is finally effected.

A similar method is known from International patent application WO 96/25368, wherein first solid constituents are removed from a strongly concentrated waste water flow, which flow is then heated to a temperature of 30–35° C. and subsequently subjected to an anaerobic fermentation process. The effluent obtained from said anaerobic fermentation is supplied to an ultrafiltration unit. According to this method, the aqueous waste flow is eventually separated into a substantially pure water flow, a methane-containing gas flow and a residual flow, in which organic and inorganic constituents are present, which residual flow serves as a starting material for liquid fertilizer. There is no recirculation of process flows in this method. One drawback of such a method for treating aqueous flows in a bioreactor and an ultrafiltration unit is that a residual flow is produced, which contains few useful constituents. Although such a residual flow can be used as a starting material for liquid fertilizer, it will have to be regarded as a waste product in practice. The costs of discharging such a residual flow will become higher, due to the increasing antipollution tax, which will have a negative effect on the total processing costs involved in the treatment of aqueous waste flows.

Accordingly, it is an objective of the present invention to develop a method and a device for treating aqueous flows, wherein the aforesaid drawbacks are avoided.

Another objective of the present invention is to develop a new method and a device wherein waste water is purified to such a degree that a substantial part of the purified water can be reused in the processing process.

Another objective of the present invention is to develop an essentially closed circuit water system, so that it is no longer necessary to pump up fresh ground water each time. The previously pumped-up ground water can be purified time and again after being used in the production process and subsequently be reused as process water.

According to the present invention, the method for treating aqueous flows as referred to in the introduction is characterized in that a separation into a product flow and a discharge flow containing dissolved substances takes place in the membrane filtration unit, which discharge flow is supplied to the bioreactor, wherein the product flow is recirculated to the aqueous flows to be treated so as to obtain an essentially closed circuit water system.

In practice it has become apparent that the discharge flow, which contains dissolved substances, can be reused in an advantageous manner by supplying said discharge flow to the bioreactor anew. Thus, an additional conversion of the useful materials in the discharge flow which are to be microbiologically converted takes place in the bioreactor.

According to the present method, the product flow which is produced in the membrane filtration unit is recirculated to the aqueous flows to be treated, in order to obtain an essentially closed circuit water system. The phrase "recirculated to the aqueous flows to be treated" is to be understood to mean that said recirculation takes place to the ground water, process water or to the ground water, process water that has thus been processed in the production process. The phrase thus comprises the embodiment wherein the ground water, process water has not been supplied to the production process yet as well as the embodiment wherein the ground water, process water has already been supplied to the production process. The use of an essentially closed circuit water system will reduce the need to pump up fresh ground water time and again, since the quality of the product flow that is obtained in accordance with the present invention is such that this product flow can be reused as process water.

In order to achieve high biological conversion rates in the bioreactor, it is preferred to recirculate the concentrate flow from the ultrafiltration unit to the bioreactor. In this way, no biomass will be washed out of the system, thus ensuring a high biomass loading in the bioreactor, which has an advantageous effect on the biological conversion process. It should be apparent, however, that an amount of non-biodegradable material will accumulate in the bioreactor. Such material will reduce the reactor volume which is required for the conversion process, which makes it desirable to remove said flow of material from the bioreactor. In practice, such a flow of material, also known as sludge, is often carried off to a so-called destruction company for further processing.

In a preferred embodiment of the method according to the present invention, it is preferred to subject the product flow from the membrane filtration unit to one or more final treatments before said product flow is recirculated to the aqueous flows to be treated, also called process water. Degassing, aeration and pH correction are suitable final treatments. Due to the biological conversion in the bioreactor and the subsequent separation in the ultrafiltration unit and the membrane filtration unit, the quality of the product flow may be too low to enable its use it as process water. The quality of the product flow can be brought into conformity with the requirements which are made of the process water by subjecting it to a final treatment in this manner.

According to a special embodiment of the method according to the present invention, it is preferred to recirculate part of the permeate flow from the ultrafiltration unit to the bioreactor with a view to creating advantageous biological conditions in the bioreactor. The permeate flow may contain constituents which have undergone incomplete biological treatment or which have been converted incompletely, so that an additional biological conversion process is required, which is realised by recirculating part of the permeate flow to the bioreactor before supplying it to the membrane filtration unit.

In a particular embodiment it is furthermore desirable to recirculate part of the product flow from the membrane filtration unit to the bioreactor. Such a recirculation of the product flow is for example desirable when the composition or the amount of the influent from the bioreactor is such that it is desirable to supply an additional aqueous flow thereto, in particular to recirculate part of the product flow from the membrane filtration unit. It should be apparent that such a product flow to be recirculated may or may not be subjected to a final treatment, as has been extensively discussed in the above.

Although it is possible in a special embodiment of the method according to the present invention to recirculate one or more additional aqueous flows to the bioreactor, namely a permeate flow from the ultrafiltration unit, a discharge flow from the membrane filtration unit, a concentrate flow from the ultrafiltration unit, a product flow from the membrane filtration unit or a product flow that has been subjected to a final treatment, it should be apparent that it is also possible in certain embodiments to supply ground water or process water to the bioreactor as an additional aqueous flow.

It is preferred to meter certain additives to the aqueous flow or flows to the bioreactor, also called influent, with a view to creating advantageous microbiological conditions in the bioreactor. Examples of such additives are: additives for correcting the pH value, in particular to a value which ranges between 5 and 9, additives which stimulate the bacteriological conversion process, such as nitrogen-containing starting materials and the like.

In addition to that, it is desirable in certain embodiments to adjust the temperature of the inflowing aqueous flows of the bioreactor to a value which is desired for said microbiological conversion process. After all, the conditions in the bioreactor must be selected such that the desired conversion of biological constituents is achieved, which conditions are partially influenced by the temperature of the inflowing aqueous flow. If the temperature of the inflowing aqueous flow of the bioreactor is too low, it is preferred to raise the temperature by using a heat exchanger. If the temperature of the inflowing aqueous flow of the bioreactor is too high, it is preferred to lower said temperature by using a heat exchanger.

The membrane filtration unit which is used in the present invention is a membrane filtration unit having a pore size which is smaller than the pore size of the ultrafiltration unit which is used, that is, a nanofiltration unit or a hyperfiltration unit will be suitable. The choice between the two membrane filtration units is determined on the basis of the acceptation of the substances which are present in the product flow. Thus, it is possible to control the quality of the product flow to be recirculated to the aqueous flows to be treated so as to obtain an essentially closed circuit water system. Monovalent ions are only partially removed by a nanofiltration unit, whilst a hyperfiltration unit will remove them almost 100%. The selection of one of the two types is made on the basis of the desired function of said membrane filtration units.

The method according to the present invention is suitable for treating any aqueous flow which contains biodegradable constituents. Examples of suitable aqueous waste flows are: waste water from the meat processing industry, waste water from households, waste water from the foodstuffs industry and the like.

The present invention furthermore relates to a device for treating aqueous flows in a bioreactor, an ultrafiltration unit and a membrane filtration unit, which device is provided with the necessary pipes and pumps, whereby a separation into a permeate flow and a concentrate flow takes place in said ultrafiltration unit.

The device according to the present invention as referred to above is characterized in that the permeate flow is connected to a membrane filtration unit via a pipe, in which unit a separation into a product flow and a discharge flow containing dissolved substances takes place, which discharge flow is connected to the bioreactor via a pipe, wherein the product flow is connected to the aqueous flows to be treated via a pipe so as to obtain an essentially closed circuit water system.

The selection of the membrane filtration unit to be used is made on the basis on the desired function thereof. Monovalent ions are only partially removed by a nanofiltration unit, whilst a hyperfiltration unit will remove them almost one hundred per cent.

In the device according to the present invention, the product flow from the membrane filtration unit is connected via a pipe to the aqueous flows to be treated, so as to create an essentially closed circuit water system. When such a method is used, the need to pump up fresh ground water is eliminated, so that an advantageous reuse of the waste flows in the process takes place.

In order to prevent the biomass from being washed out, it is preferred to connect the concentrate flow from the ultrafiltration unit to the bioreactor via a pipe.

In another embodiment of the present invention, the product flow from the membrane filtration unit is preferably connected, via a pipe, to a final treatment unit, preferably degassing, aeration, pH correction or a combination thereof, before being recirculated to the aqueous flows to be treated. In practice it has become apparent that the quality of the obtained product flow is generally too low to be recirculated directly to the aqueous flows to be treated in order to obtain an essentially closed circuit water system. By supplying said product flow to a final treatment unit, the quality of the product flow is brought into conformity with that of the aqueous flows to be treated.

The composition or the supply rate of the influent of the bioreactor may be such that the conditions which are favourable for biological conversion are not achieved in the bioreactor, so that it is preferred in certain embodiments to connect a pipe, via which a certain part of the permeate flow from the ultrafiltration unit is supplied, for example, to the influent of the bioreactor. In addition to that it is possible to connect to the influent of the bioreactor a pipe which for example carries a certain part of the product flow from the membrane filtration unit. In addition to that it may be desirable to supply the flow from the final treatment unit, in whole or in part, directly to the bioreactor. Moreover, in some embodiments it is preferred to supply the aqueous flow to be treated or the ground water, in whole or in part, directly to the bioreactor.

In another embodiment of the present invention it is preferred to connect the bioreactor to a pipe for applying additives, which additives influence the microbiological conditions in the bioreactor advantageously. In addition to that it is desirable to connect the flow to the bioreactor to a heat exchanger, in which heat exchanger the temperature which is desirable for the bioreactor is reached.

The present invention will be explained in more detail hereafter by means of a few examples and special embodiments, wherein it should be noted that the present invention is by no means limited to such special examples and embodiments.

Figure 1:
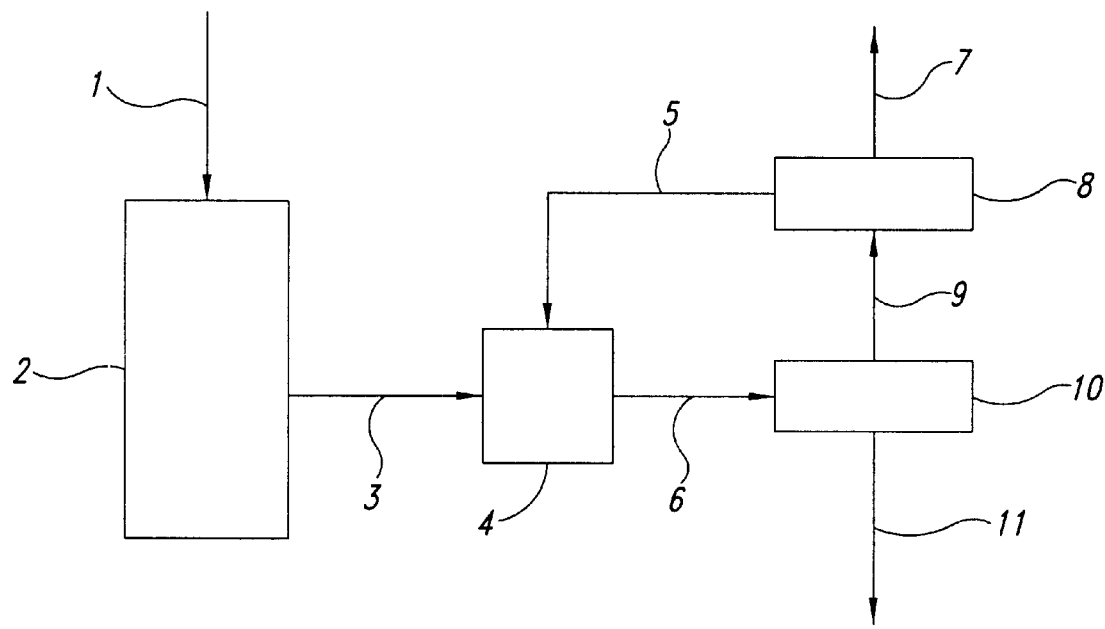
FIG. 1 is a schematic flow diagram for the treatment of waste water according to the prior art.

FIG. 1 schematically shows a flow diagram for the treatment of waste water according to the prior art. It should be noted that like parts are indicated by like numerals FIGS. 1–4. Ground water or process water 1 is supplied to processing unit 2. According to the present invention, such a processing unit 2 is understood to be a place where process water or ground water 1 is used in a useful manner, for example the fish or meat processing industry, households, the foodstuffs industry and the like. An aqueous flow or influent 3 to be treated, also called waste water, is produced in processing unit 2, which aqueous flow 3 to be treated is supplied to a bioreactor 4. It should be apparent that besides the aqueous flow 3 to be treated, also other flows (not shown) may be produced in processing unit 2, which may or may not be supplied to bioreactor 4. For example, a flow of more or less solid constituents, which flow is produced as a result of a separation, for example filtration, pressing and the like, which takes place in processing unit 2. Such a separation operation is generally carried out so as not to affect the biological conversion process in bioreactor 4, and also to prevent clogging of ultrafiltration unit 10. A biological conversion process takes place in bioreactor 4, and the flow 6 exiting from bioreactor 4, also called effluent, is supplied to an ultrafiltration unit 10. A separation into a permeate flow 9 and a concentrate flow 11 takes place in ultrafiltration unit 10. According to the ultrafiltration unit 10 as shown in FIG. 1, concentrate flow 11 is discharged. The permeate flow 9 obtained in ultrafiltration unit 10 is then supplied to a membrane filtration unit 8, wherein a separation into a product flow 7 and a discharge flow 5 containing dissolved materials takes place, which discharge flow 5 is preferably recirculated to bioreactor 4. The product flow 7 thus obtained can be used for further purposes.

Figure 2:
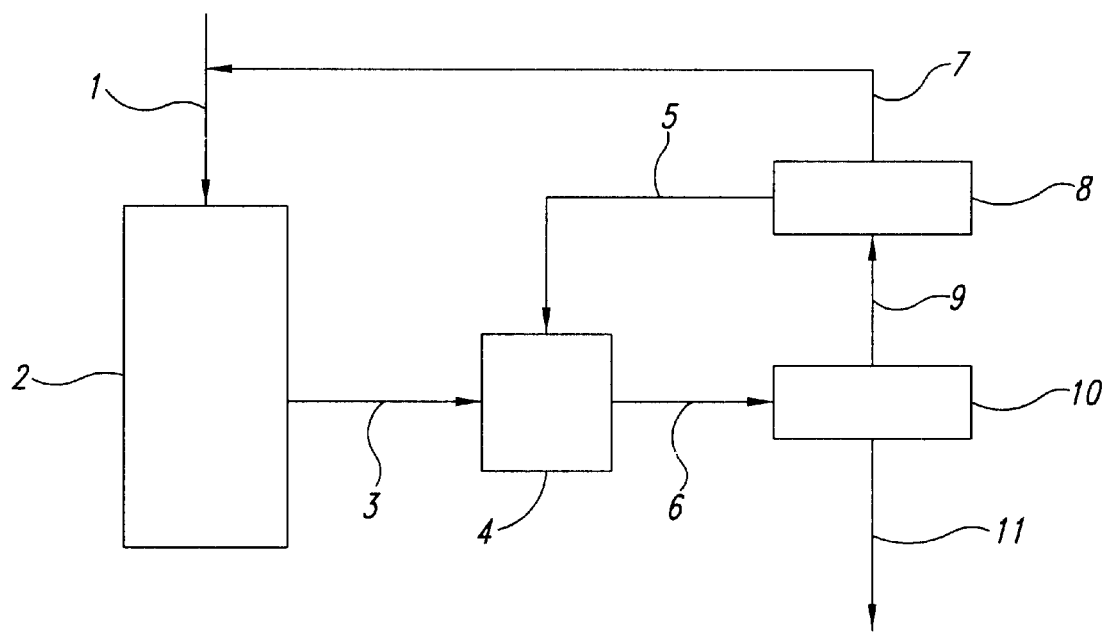
FIG. 2 shows a flow diagram of the device according to the present invention, wherein the product flow produced at the membrane filtration unit is recirculated to the aqueous flows to be treated, so as to obtain an essentially closed circuit water system.

FIG. 2 shows a device according to the present invention, wherein the product flow 7 exiting from membrane filtration unit 8 is recirculated to process water or ground water 1, however. In addition, waste flow 5 is recirculated to bioreactor 4. By recirculating product flow 7 in this manner, an essentially closed circuit water system is created. Such an essentially closed circuit water system reduces the need to pump up fresh ground water 1, which will result in a considerable saving. It is also possible to supply product flow 7, in whole or in part, to bioreactor 4, if desired.

Figure 3:
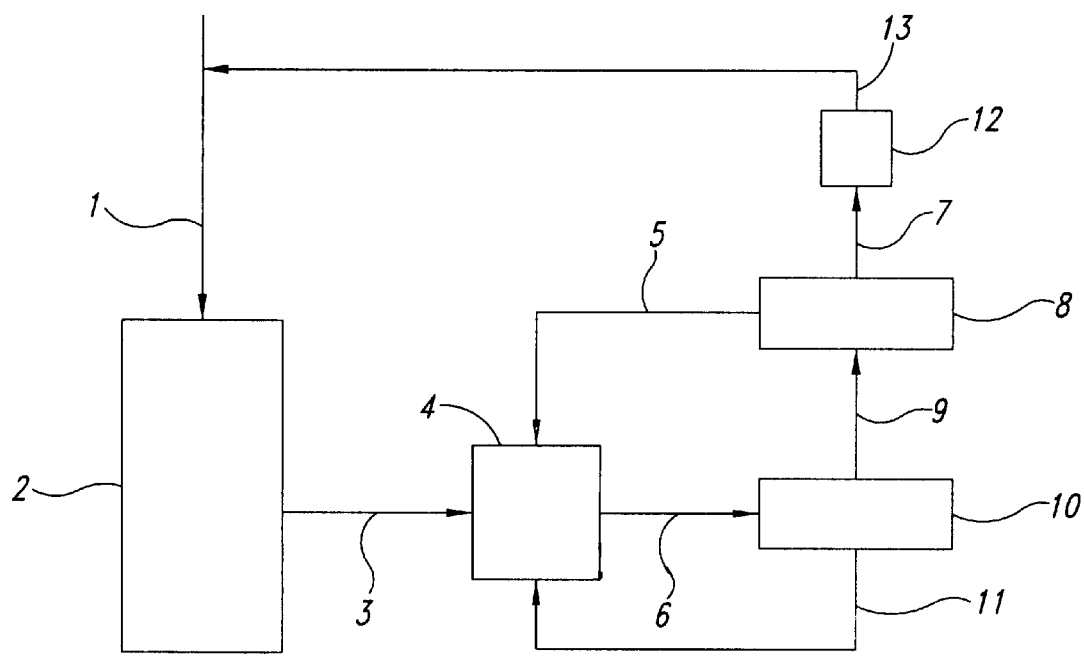
FIG. 3 shows the flow diagram of FIG. 2, wherein the product flow is subjected to a final treatment before being recirculated, and wherein the concentrate flow from the ultrafiltration unit is supplied to the bioreactor.

FIG. 3 shows the device of FIG. 2 in a special embodiment thereof, wherein the concentrate flow 11 produced at ultrafiltration unit 10 is recirculated to bioreactor 4, however. The recirculation of the concentrate flow 11 to bioreactor 4 prevents biomass from being washed out of the system, thus ensuring a high concentration of biomass in bioreactor 4, which has an advantageous effect on the biological conversion process in bioreactor 4. In addition to that, the product flow 7 exiting from membrane filtration unit 8 is supplied to a final treatment unit 12. Degassing, aeration of pH correction units, for example, are a suitable final treatment unit 12. The flow 13 exiting from final treatment unit 12 is then recirculated to ground water or process water 1 for effecting an essentially closed circuit water system. Also the flow 13 exiting from final treatment unit 12 can be supplied to the bioreactor 4 in whole or in part, if desired. Although FIG. 3 shows the recirculation of concentrate flow 11 to bioreactor 4 as well as the subjection to a final treatment of product flow 7 in final treatment unit 12, it will be apparent to those skilled in this field of the art that these measures may also be carried out independently of each other.

Figure 4:
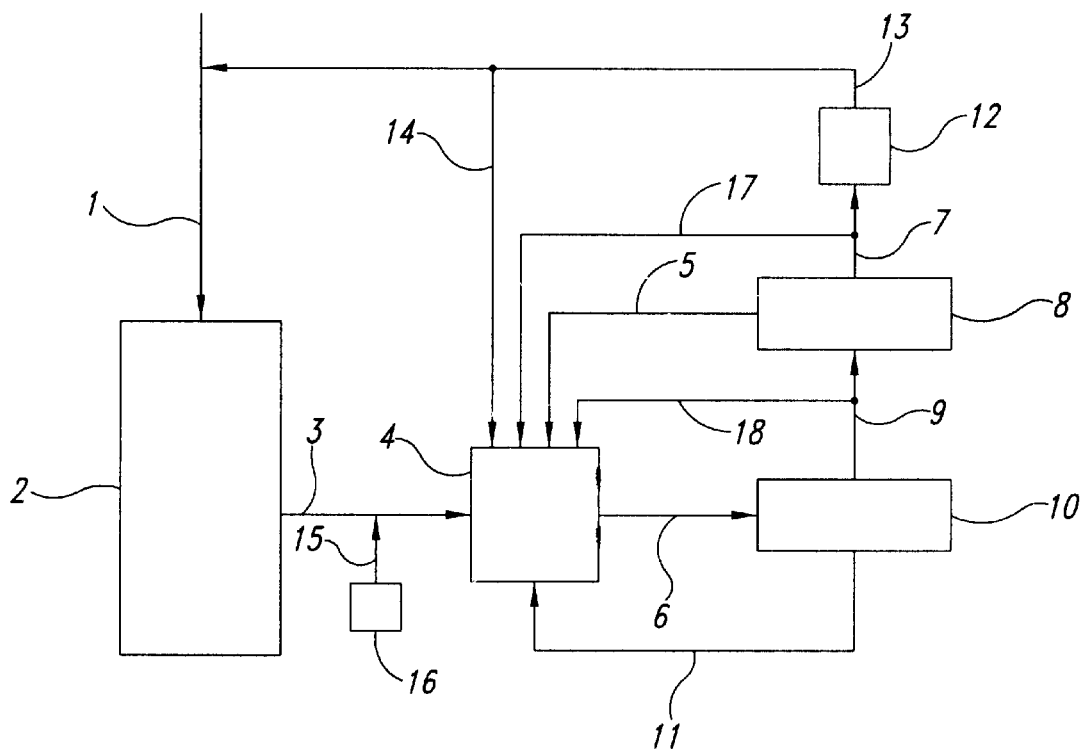
FIG. 4 shows the flow diagram of FIG. 3, wherein part of the permeate flow from the ultrafiltration unit, part of the product flow from the membrane filtration unit and part of the product flow that has been subjected to a final treatment are recirculated to the bioreactor. Furthermore it is indicated in this figure that metering of additives to the bioreactor takes place.

FIG. 4 shows a special embodiment of the device according to the present invention as shown in FIG. 3, wherein a number of modifications have been carried through The permeate flow 9 exiting from ultrafiltration unit 10 is partially recirculated to bioreactor 4 via pipe 18. In addition to that, also the product flow 7 exiting from membrane filtration unit 8 is partially recirculated to bioreactor 4 via pipe 17. In addition to that, also the flow 13 exiting from final treatment unit 12 is partially recirculated to bioreactor 4 via a pipe 14. Although the diagram of FIG. 4 indicates that the flows 5, 11, 14, 17, 18 which are recirculated to bioreactor 4 are supplied directly to the bioreactor 4 itself, it will be obvious to those skilled in this field of the art that one or more of said flows 5, 11, 14, 17, 18 may be supplied to 2. Mixer (not shown), after which the flows thus mixed are supplied to bioreactor 4. It is also possible to supply part of the ground water or process water 1 directly to bioreactor 4, although this is not shown in FIG. 4. In certain embodiments, such pr-mixing is desirable in order to ensure the homogeneity of the contents of bioreactor 4. The composition of the aqueous flow 3 to be supplied to bioreactor 4 may be such that it is desirable to supply additives 16 via pipe 15.

Figure 5:
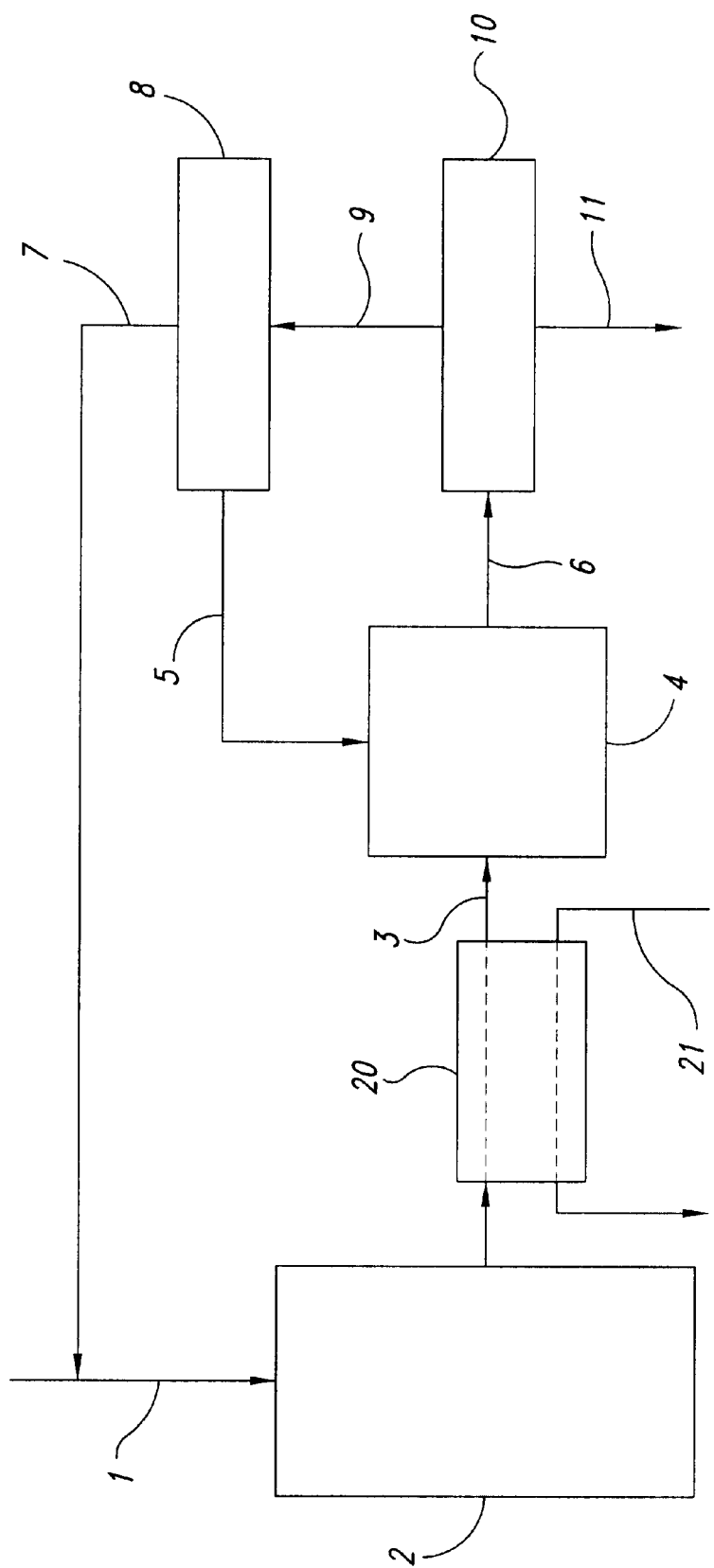
FIG. 5 shows the flow diagram of FIG. 2, wherein the aqueous flows to be treated are first passed through a heat exchanger before being passed to the bioreactor.

In a particular embodiment, as shown in FIG. 5, it is desirable to pass the flow 3 to bioreactor 4 through a heat exchanger 20 in order to ensure that flow 3 gas the temperature which is required for the biological conversion process in bioreactor 4. It is possible to first supply to heat exchanger 20 all flows to be supplied to bioreactor 4. It should be apparent that the measures forming part of the combination of measures as shown, for example, in FIGS. 4 and 5, may also by used independently of each other, and that the present invention is by no means limited to a special combination of measures.

What is claimed is:

1. A method for purifying, in an essentially closed circuit water purification system, an aqueous flow from a processing unit, comprising the steps of:
   (a) supplying to a bioreactor, and combining therein, the aquecus flow, as well as a discharge flow from a membrane filtration unit, the membrane filtration unit being located downstream of the bioreactor and included in the closed circuit water purification system;
   (b) allowing microbiological conversion of biodegradable constituents present in and contaminating the combined aqueous and discharge flows, to take place in the bioreactor, thereby, generating an effluent flow from the aqueous and discharge flows thus treated, the effluent flow exiting from the bioreactor;
   (c) supplying the effluent flow from the bioreactor to an ultrafiltration unit so as to separate therein the effluent flow into a permeate flow and a concentrate flow;
   (d) supplying at least a portion of the permeate flow to a membrane filtration unit so as to separate therein the permeate flow into a product flow and the discharge flow, the discharge flow comprising dissolved substances; and
   (e) supplying the discharge flow to the bioreactor, as noted in step (a), supplying at least a portion of the product flow from the membrane filtration unit to the processing unit, and supplying at least a portion of the concentrate flow from the ultrafiltration unit to the bioreactor.

2. A method for purifying, in an essentially closed circuit water purification system, an aqueous flow from a processing unit, comprising the steps of:
   (a) supplying to a bioreactor, and combining therein, the aqueous flow, as well as a discharge flow from a membrane filtration unit, the membrane filtration unit being located downstream of the bioreactor and included in the closed circuit water purification system;
   (b) allowing microbiological conversion of biodegradable constituents present in and contaminating the combined aqueous and discharge flows, to take place in the bioreactor, thereby, generating an effluent flow from the aqueous and discharge flows thus treated, the effluent flow exiting from the bioreactor;
   (c) supplying the effluent flow from the bioreactor to an ultrafiltration unit so as to separate therein the effluent flow into a permeate flow and a concentrate flow;
   (d) supplying at least a portion of the permeate flow to a membrane filtration unit so as to separate therein the permeate flow into a product flow and the discharge flow, the discharge flow comprising dissolved substances;
   (e) supplying the discharge flow to the bioreactor, as noted in step (a), and supplying at least a portion of the product flow from the membrane filtration unit to the processing unit; and
   (f) supplying a portion of the permeate flow from the ultrafiltration unit to the bioreactor.

3. A method for purifying, in an essentially closed circuit water purification system, an aqueous flow from a processing unit, comprising the steps of:
   (a) supplying to a bioreactor, and combining therein, the aqueous flow, as well as a discharge flow from a membrane filtration unit, the membrane filtration unit being located downstream of the bioreactor and included in the closed circuit water purification system;
   (b) allowing microbiological conversion of biodegradable constituents present in and contaminating the combined aqueous and discharge flows, to take place in the bioreactor, thereby, generating an effluent flow from the aqueous and discharge flows thus treated, the effluent flow exiting from the bioreactor;
   (c) supplying the effluent flow from the bioreactor to an ultrafiltration unit so as to separate therein the effluent flow into a permeate flow and a concentrate flow;
   (d) supplying at least a portion of the permeate flow to a membrane filtration unit so as to separate therein the permeate flow into a product flow and the discharge flow, the discharge flow comprising dissolved substances;
   (e) supplying the discharge flow to the bioreactor, as noted in step (a), and supplying at least a first portion of the product flow from the membrane filtration unit to the processing unit;
   (f) supplying at least a second portion of the product flow from the membrane filtration unit to the bioreactor; and
   (g) optionally, subjecting the product flow to a final treatment before supplying the same to another location in the essentially closed circuit water purification System.

4. A method for purifying, in an essentially closed circuit water purification system, an aqueous flow from a processing unit, comprising the steps of:
   (a) supplying to a bioreactor, and combining therein, the aquecus flow, as well as a discharge flow from a membrane filtration unit, the membrane filtration. Unit being located downstream of the bioreactor and included in the closed circuit water purification system;
   (b) allowing microbiological conversion of biodegradable constituents present in and contaminating the combined aqueous and discharge flows, to take placket in the bioreactor, thereby, generating an effluent flow from the aqueous and discharge floors thus treated, the effluent flow exiting from the bioreactor;

(c) supplying the effluent flow from the bioreactor to an ultra iteration unit so as to separate therein the effluent flow into a permeate flow and a concentrate flow;

(d) supplying at least a portion of the permeate flow to a membrane filtration unit so as to separate therein the permeate flow into a product flow and the discharge flow, the discharge flow comprising dissolved substances, (e) supplying the discharge flow to the bioreactor, as noted in step (a), and supplying at least a portion of the product flow from the membrane filtration unit to the processing unit; and (f) passing the aqueous flow through a heat exchanger so as to increase or decrease the temperature of the aqueous flow before supplying it to the bioreactor.

5. An apparatus for purifying an aqueous flow from a processing unit, comprising:

(a) a bioreactor adapted to microbiologically convert biodegradable constituents present in aqueous flows received therein, and to, thereby, yield an effluent flow exiting therefrom;

(b) an ultrafiltration unit adapted to separate an aqueous flow received therein into a permeate flow and a concentrate flow, exiting therefrom;

(c) a membrane filtration unit adapted to separate an aqueous flow received therein into a discharge flow comprising dissolved substances and a product flow, exiting therefrom, wherein the bioreactor receives the aqueous flow to be purified from the processing unit and the discharge flow from the membrane filtration unit, the ultrafiltration unit receives the effluent flow from the bioreactor, the membrane filtration unit receives at least a portion of the permeate flow from the ultrafiltration unit, the concentrate flow is discharged from the ultrafiltration unit, and the processing unit receives at least a portion of the product flow from the membrane filtration unit.

6. The apparatus of claim 5 wherein the bioreactor receives at least a portion of the concentrate flow from the ultrafiltration unit, in addition to the aqueous flow to be purified from the processing unit and the discharge flow from the membrane filtration unit.

7. The apparatus of claim 5, further comprising a final treatment unit that receives the product flow from the membrane filtration unit, finally treating the product flow therein, wherein the processing unit then receives at least a portion of the finally treated product flow.

8. The apparatus of claim 7 wherein the final treatment unit is adapted to aerate the product flow received therein.

9. The apparatus of claim 7 wherein the final treatment unit is adapted to adjust the pH of the product flow received therein.

10. The apparatus of claim 7 wherein the final treatment unit is adapted to degas the product flow received therein.

11. The apparatus of claim 7 wherein the bioreactor receives a portion of the finally treated product flow.

12. The apparatus of claim 5 wherein the bioreactor receives a portion of the permeate flow from the ultrafiltration unit.

13. The apparatus of claim 5 wherein the bioreactor receives a portion of the product flow from the membrane filtration unit.

14. The apparatus of claim 5 wherein the bioreactor further receives additives capable of promoting biological conditions in the bioreactor.

15. The apparatus of claim 5, further comprising a heat exchanger that receives the aqueous flow to be purified from the processing unit, wherein the aqueous flow from the processing unit passes through and exits from the heat exchanger, its temperature thereby being increased or decreased, and wherein the bioreactor receives the aqueous flow that exits from the heat exchanger.

16. The apparatus of claim 5 wherein the membrane filtration unit is a nanofiltration unit.

17. The apparatus of claim 5 wherein the membrane filtration unit is a hyperfiltration unit.

18. The apparatus of claim 5 wherein the aqueous flow is a wastewater flow, and wherein the processing unit is any place where groundwater or process water is utilized with the result that the wastewater flow is generated therefrom, the wastewater flow comprising and being contaminated by biodegradable constituents.

19. The apparatus of claim 18 wherein the processing unit is used to commercially process fish or meat.

* * * * *

UNITED STATES PATENT AND TRADEMARK OFFICE
CERTIFICATE OF CORRECTION

PATENT NO.    : 6,592,763 B1                                          Page 1 of 1
DATED         : July 15, 2003
INVENTOR(S)   : Hendrik Rienk Benedictus et al.

It is certified that error appears in the above-identified patent and that said Letters Patent is hereby corrected as shown below:

Column 7,
Line 38, "aquecus flow," should read as -- aqueous flow, --.

Column 8,
Lines 56 & 57, "purification System." should read as -- purification system. --.
Line 62, "aquecus flow," should read as -- aqueous flow, --.
Line 63, "filtration. Unit," should read as -- filtration unit, --.

Column 9,
Line 1, "to take placket" should read as -- to take place --.
Line 3, "discharge floors" should read as -- discharge flows --.
Line 6, "ultra iteration unit" should read as -- ultrafiltration unit --.

Signed and Sealed this

Ninth Day of March, 2004

JON W. DUDAS
*Acting Director of the United States Patent and Trademark Office*